(12) United States Patent
Hao et al.

(10) Patent No.: US 8,415,269 B2
(45) Date of Patent: *Apr. 9, 2013

(54) PALLADIUM-GOLD CATALYST SYNTHESIS

(75) Inventors: Xianghong Hao, Foster City, CA (US);
Ramesh Sharma, Sunnyvale, CA (US);
Geoffrey McCool, Hayward, CA (US);
Brian Harrison, Sandy (GB); Dietmar Wahl, Neustadt/Weinstrasse (DE)

(73) Assignee: WGCH Technology Limited, London (GB)

( * ) Notice: Subject to any disclaimer, the term of this patent is extended or adjusted under 35 U.S.C. 154(b) by 501 days.

This patent is subject to a terminal disclaimer.

(21) Appl. No.: 12/686,568

(22) Filed: Jan. 13, 2010

(65) Prior Publication Data

US 2010/0184587 A1 Jul. 22, 2010

Related U.S. Application Data

(63) Continuation-in-part of application No. 12/357,346, filed on Jan. 21, 2009, now Pat. No. 7,709,407.

(51) Int. Cl.
*B01J 29/06* (2006.01)
*B01J 23/44* (2006.01)
*B01J 23/52* (2006.01)

(52) U.S. Cl. ............ 502/325; 502/66; 502/64; 502/339; 502/332; 502/333; 502/334; 502/330

(58) Field of Classification Search .................. 502/64, 502/66, 325, 339, 332, 333, 334, 330
See application file for complete search history.

(56) References Cited

U.S. PATENT DOCUMENTS

| | | | |
|---|---|---|---|
| 3,775,342 A | | 11/1973 | Kronig et al. |
| 3,822,308 A | | 7/1974 | Kronig et al. |
| 4,048,096 A | | 9/1977 | Bissot |
| 4,087,622 A | | 5/1978 | Nakamura et al. |
| 4,533,779 A | * | 8/1985 | Boitiaux et al. ............. 585/259 |
| 5,505,921 A | | 4/1996 | Luckoff et al. |
| 5,629,462 A | | 5/1997 | Rao |
| 5,693,302 A | | 12/1997 | Gary |
| 6,034,030 A | * | 3/2000 | Nicolau et al. ............. 502/326 |
| 6,093,378 A | | 7/2000 | Deeba et al. |
| 6,391,821 B1 | | 5/2002 | Satoh et al. |
| 6,600,080 B1 | | 7/2003 | Nagamura et al. |
| 7,709,407 B1 | | 5/2010 | Hao |
| 2003/0195114 A1 | | 10/2003 | Tacke et al. |
| 2008/0124514 A1 | | 5/2008 | Fujdala et al. |
| 2008/0125309 A1 | | 5/2008 | Fujdala et al. |
| 2008/0125313 A1 | | 5/2008 | Fujdala et al. |

FOREIGN PATENT DOCUMENTS

| | | |
|---|---|---|
| GB | 1 559 540 | 1/1980 |
| JP | 7204508 | 8/1995 |
| JP | 2001104804 | 4/2001 |
| WO | WO 02/078839 | 10/2002 |

OTHER PUBLICATIONS

Ru-Shi Liu, Hau-Ming Chen, and Shu-Fen Hu, Synthesis and Characterization of Nano Metals With Core-Shell Structure, 2004, pp. 160-163, China Particuology, vol. 2, No. 4.
A. M. Venezia, V. La Parola, B. Pawelec, and J. L. G. Fierro, Hydrogenation of Aromatics Over Au-Pd/SiO$_2$—Al$_2$O$_3$ Catalysts; Support Acidity Effect, pp. 43-51, Elsevier B.V. 2003.
Yang Zhou, Shixing Wang, Bingjun Ding, and Zhimao Yang, Preparation of Onion-Like Pd-Bi-Au/C Trimetallic Catalyst, pp. 182-186, J Sol-Gel Sci Technol (2008) 47, Springer Science+Business Media, LLC 2008.
PCT Search Report for International Application No. PCT/US2010/021526 dated Sep. 6, 2010.
EP Search Report for Application No. 10738932.2-1270 /2389243 PCT/US2010021526 dated Mar. 12, 2012.

* cited by examiner

*Primary Examiner* — Elizabeth Wood
(74) *Attorney, Agent, or Firm* — Patterson & Sheridan, LLP

(57) ABSTRACT

A supported palladium-gold catalyst is produced under mild conditions using a commonly available base, such as sodium hydroxide (NaOH) or sodium carbonate (Na$_2$CO$_3$). In this method, support materials and a base solution are mixed together and the temperature of the mixture is increased to a temperature above room temperature. Then, palladium salt and gold salt are added to the mixture while maintaining the pH of the mixture to be greater than 7.0 and keeping the mixture at a temperature above room temperature. This is followed by cooling the mixture while adding acetic acid to maintain the pH of the mixture to be within a desired pH range, filtering out the supported palladium-gold particles, washing with a pH buffer solution and calcining.

19 Claims, 12 Drawing Sheets

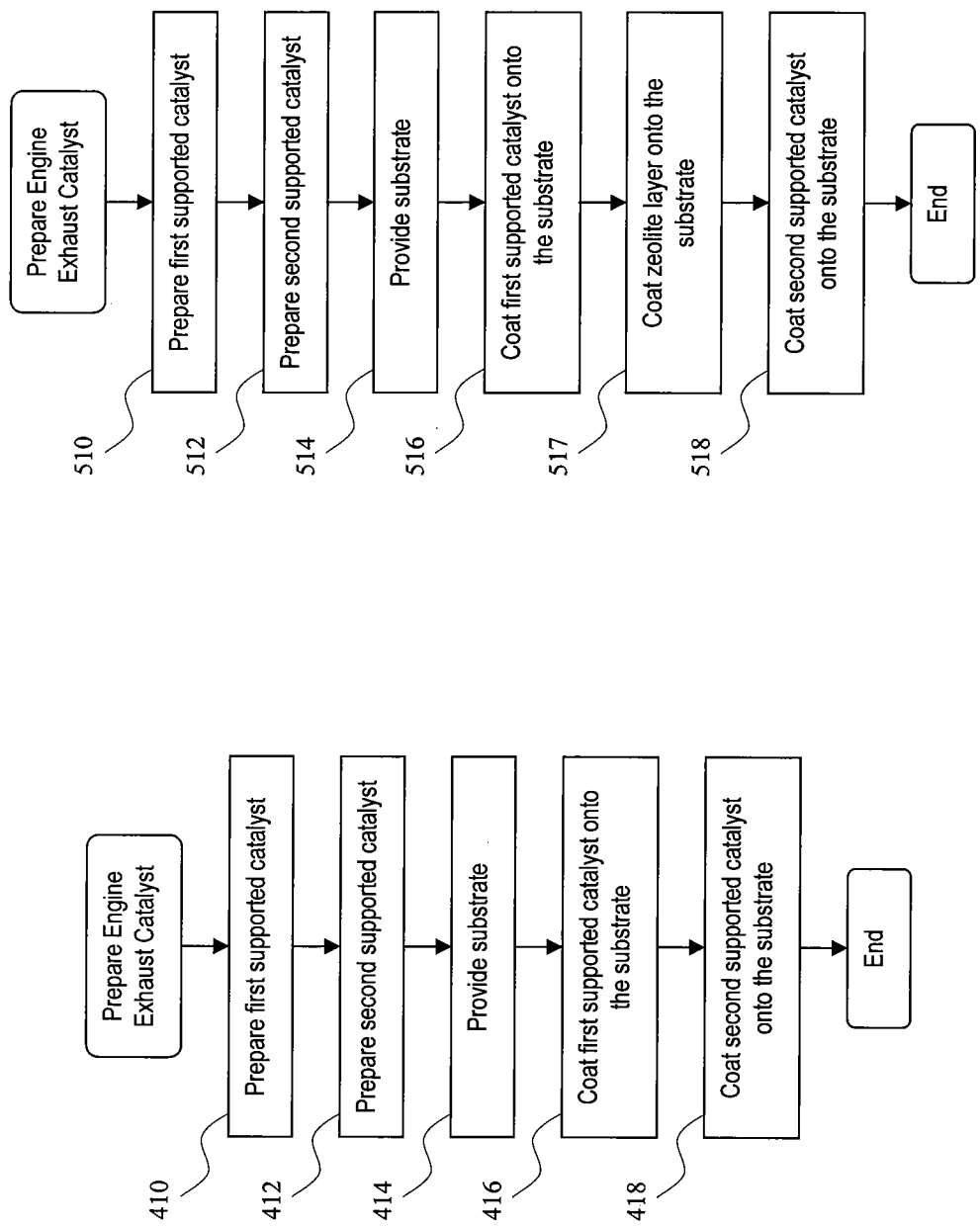

PALLADIUM-GOLD CATALYST SYNTHESIS

CROSS-REFERENCE TO RELATED APPLICATIONS

This application is a continuation-in-part of U.S. patent application Ser. No. 12/357,346, filed Jan. 21, 2009 now U.S. Pat. No. 7,709,407.

BACKGROUND OF THE INVENTION

1. Field of the Invention

Embodiments of the present invention generally relate to supported catalysts containing precious group metals and, more particularly, to engine exhaust catalysts containing palladium and gold, and methods of production thereof.

2. Description of the Related Art

Many industrial products such as fuels, lubricants, polymers, fibers, drugs, and other chemicals would not be manufacturable without the use of catalysts. Catalysts are also essential for the reduction of pollutants, particularly air pollutants created during the production of energy and by automobiles. Many industrial catalysts are composed of a high surface area support material upon which chemically active metal nanoparticles (i.e., nanometer sized metal particles) are dispersed. The support materials are generally inert, ceramic type materials having surface areas on the order of hundreds of square meters/gram. This high specific surface area usually requires a complex internal pore system. The metal nanoparticles are deposited on the support and dispersed throughout this internal pore system, and are generally between 1 and 100 nanometers in size.

Supported catalysts are quite useful in removing pollutants from vehicle exhausts. Vehicle exhausts contain harmful pollutants, such as carbon monoxide (CO), unburned hydrocarbons (HC), and nitrogen oxides ($NO_x$), that contribute to the "smog-effect" that have plagued major metropolitan areas across the globe. Catalytic converters containing supported catalysts and particulate filters have been used to remove such harmful pollutants from the vehicle exhaust. While pollution from vehicle exhaust has decreased over the years from the use of catalytic converters and particulate filters, research into improved supported catalysts has been continuing as requirements for vehicle emission control have become more stringent and as vehicle manufacturers seek to use less amounts of precious metal in the supported catalysts to reduce the total cost of emission control.

The prior art teaches the use of supported catalysts containing palladium and gold as good partial oxidation catalysts. As such, they have been used extensively in the production of vinyl acetate in the vapor phase by reaction of ethylene, acetic acid and oxygen. See, e.g., U.S. Pat. No. 6,022,823. As for vehicle emission control applications, U.S. Pat. No. 6,763,309 speculates that palladium-gold might be a good bimetallic candidate for increasing the rate of NO decomposition. The disclosure, however, is based on a mathematical model and is not supported by experimental data. There is also no teaching in this patent that a palladium-gold system will be effective in treating vehicle emissions that include CO and HC.

U.S. patent application Ser. No. 11/624,116 and U.S. patent application Ser. No. 11/624,128 disclose engine exhaust catalysts containing palladium and gold that have been proven to be effective in treating vehicle emissions that include CO and HC. The process disclosed in these patent applications for producing palladium-gold catalysts involves contacting of a support material such as alumina with metal salt solutions containing palladium and gold, and reducing the palladium and gold ions to metal particles in situ and in the presence of the support material using suitable reducing agents. Suitable reducing agents include one or more of sodium borohydride ($NaBH_4$) and hydrazine ($N_2H_4$), both of which are hazardous and require special handling and disposal.

SUMMARY OF THE INVENTION

One or more embodiments of the present invention provide methods for producing supported palladium-gold catalysts under mild conditions using a commonly available base, such as sodium hydroxide (NaOH) or sodium carbonate ($Na_2CO_3$). One advantage of these methods is that they do not require special handling and disposal, which can be very costly for mass production. Another advantage of these methods is that a separate reducing agent need not be added to produce palladium-gold metal particles.

A method for producing a supported catalyst containing palladium-gold metal particles, according to an embodiment of the invention, includes the steps of preparing a mixture of support materials and a solution that is basic and having a pH that is greater than 9.0, adding a palladium salt solution and a gold salt solution, which have been separately prepared, to the mixture while maintaining the pH of the mixture to be greater than 7.0, heating the mixture and maintaining the mixture at 343 K to 369 K above room temperature for a period of time, and cooling the mixture and, while cooling, maintaining the pH of the mixture to be between 7.7 and 8.1, by adding, for example, acetic acid.

A method for producing a supported catalyst containing palladium-gold metal particles, according to another embodiment of the invention, includes the steps of preparing a mixture of support materials and a solution that is basic and having a pH that is greater than 7.0, adding a palladium salt solution and a gold salt solution, which have been separately prepared, to the mixture while maintaining the pH of the mixture to be greater than 7.0, filtering the mixture to separate out the supported catalyst, and washing the supported catalyst with a pH buffer solution including bicarbonates, e.g., ammonium bicarbonate.

The present invention also provides an emission control catalyst for treating an engine exhaust comprising an alumina support and metal particles consisting essentially of palladium and gold dispersed within pores of the alumina support, wherein at least ⅔ of the pores on the surface of the alumina support have diameters that are greater than 10 nm, and about ½ of the pores on the surface of the alumina support have diameters that are greater than 20 nm.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a flow diagram illustrating the steps for preparing an emission control catalyst.

FIG. 5 is a flow diagram illustrating the steps for preparing an emission control catalyst.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claims. Likewise, reference to "the invention" shall not be construed as a generalization of any inventive subject matter disclosed herein and shall not be considered to be an element or limitation of the appended claims except where explicitly recited in the claims.

FIGS. 1A-1D are schematic representations of different engine exhaust systems in which embodiments of the present invention may be used. The combustion process that occurs in an engine 102 produces harmful pollutants, such as CO, various hydrocarbons, particulate matter, and nitrogen oxides (NOx), in an exhaust stream that is discharged through a tail pipe 108 of the exhaust system.

Figure 1A:
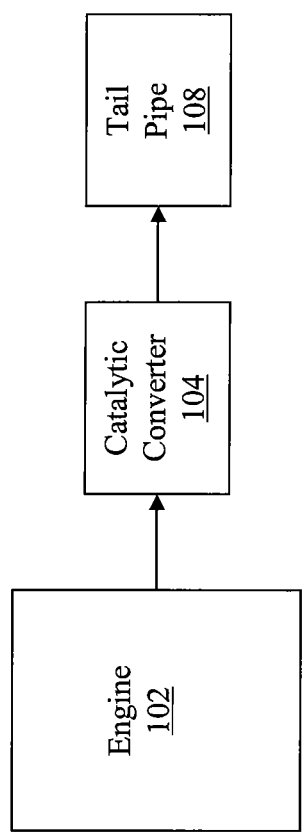
FIGS. 1A-1D are schematic representations of different engine exhaust systems in which embodiments of the present invention may be used.

In the exhaust system of FIG. 1A, the exhaust stream from an engine 102 passes through a catalytic converter 104, before it is discharged into the atmosphere (environment) through a tail pipe 108. The catalytic converter 104 contains supported catalysts coated on a monolithic substrate that treat the exhaust stream from the engine 102. The exhaust stream is treated by way of various catalytic reactions that occur within the catalytic converter 104. These reactions include the oxidation of CO to form $CO_2$, burning of hydrocarbons, and the conversion of NO to $NO_2$.

Figure 1B:
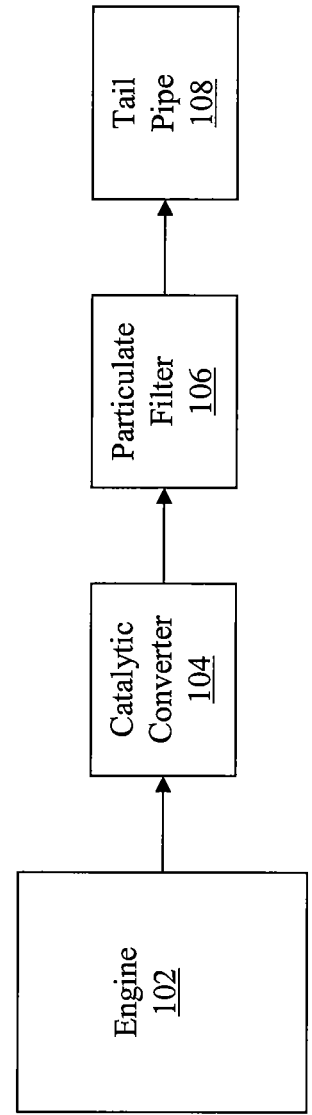

In the exhaust system of FIG. 1B, the exhaust stream from the engine 102 passes through a catalytic converter 104 and a particulate filter 106, before it is discharged into the atmosphere through a tail pipe 108. The catalytic converter 104 operates in the same manner as in the exhaust system of FIG. 1A. The particulate filter 106 traps particulate matter that is in the exhaust stream, e.g., soot, liquid hydrocarbons, generally particulates in liquid form. In an optional configuration, the particulate filter 106 includes a supported catalyst coated thereon for the oxidation of NO and/or to aid in combustion of particulate matter.

Figure 1C:
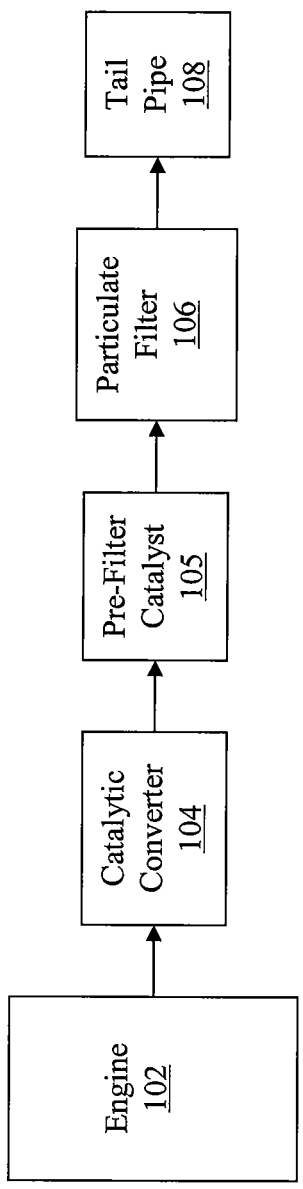

In the exhaust system of FIG. 1C, the exhaust stream from the engine 102 passes through a catalytic converter 104, a pre-filter catalyst 105 and a particulate filter 106, before it is discharged into the atmosphere through a tail pipe 108. The catalytic converter 104 operates in the same manner as in the exhaust system of FIG. 1A. The pre-filter catalyst 105 includes a monolithic substrate and supported catalysts coated on the monolithic substrate for the oxidation of NO. The particulate filter 106 traps particulate matter that is in the exhaust stream, e.g., soot, liquid hydrocarbons, generally particulates in liquid form.

Figure 1D:
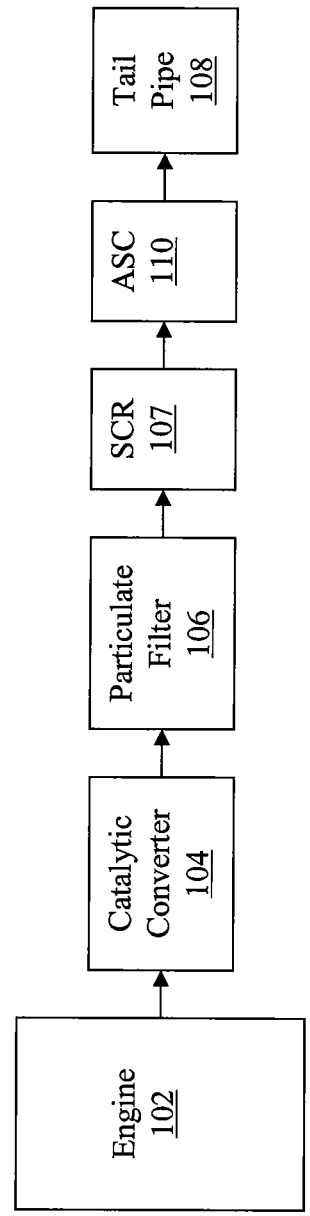

In the exhaust system of FIG. 1D, the exhaust stream passes from the engine 102 through a catalytic converter 104, a particulate filter 106, a selective catalytic reduction (SCR) unit 107 and an ammonia slip catalyst 110, before it is discharged into the atmosphere through a tail pipe 108. The catalytic converter 104 operates in the same manner as in the exhaust system of FIG. 1A. The particulate filter 106 traps particulate matter that is in the exhaust stream, e.g., soot, liquid hydrocarbons, generally particulates in liquid form. In an optional configuration, the particulate filter 106 includes a supported catalyst coated thereon for the oxidation of NO and/or to aid in combustion of particulate matter. The SCR unit 107 is provided to reduce the $NO_x$ species to $N_2$. The SCR unit 107 may be ammonia/urea based or hydrocarbon based. The ammonia slip catalyst 110 is provided to reduce the amount of ammonia emissions through the tail pipe 108. An alternative configuration places the SCR unit 107 in front of the particulate filter 106.

Alternative configurations of the exhaust system includes the provision of SCR unit 107 and the ammonia slip catalyst 110 in the exhaust system of FIG. 1A or 1C, and the provision of just the SCR unit 107, without the ammonia slip catalyst 110, in the exhaust system of FIG. 1A, 1B or 1C.

As particulates get trapped in the particulate filter within the exhaust system of FIG. 1B, 1C or 1D, it becomes less effective and regeneration of the particulate filter becomes necessary. The regeneration of the particulate filter can be either passive or active. Passive regeneration occurs automatically in the presence of $NO_2$. Thus, as the exhaust stream containing $NO_2$ passes through the particulate filter, passive regeneration occurs. During regeneration, the particulates get oxidized and $NO_2$ gets converted back to NO. In general, higher amounts of $NO_2$ improve the regeneration performance, and thus this process is commonly referred to as $NO_2$ assisted oxidation. However, too much $NO_2$ is not desirable because excess $NO_2$ is released into the atmosphere and $NO_2$ is considered to be a more harmful pollutant than NO. The $NO_2$ used for regeneration can be formed in the engine during combustion, from NO oxidation in the catalytic converter 104, from NO oxidation in the pre-filter catalyst 105, and/or from NO oxidation in a catalyzed version of the particulate filter 106.

Active regeneration is carried out by heating up the particulate filter 106 and oxidizing the particulates. At higher temperatures, $NO_2$ assistance of the particulate oxidation becomes less important. The heating of the particulate filter 106 may be carried out in various ways known in the art. One way is to employ a fuel burner which heats the particulate filter 106 to particulate combustion temperatures. Another way is to increase the temperature of the exhaust stream by modifying the engine output when the particulate filter load reaches a pre-determined level.

The present invention provides catalysts that are to be used in the catalytic converter 104 shown in FIGS. 1A-1D, or generally as catalysts in any vehicle emission control system, including as a diesel oxidation catalyst, a diesel filter catalyst, an ammonia-slip catalyst, an SCR catalyst, or as a component of a three-way catalyst. The present invention further provides a vehicle emission control system, such as the ones shown in FIGS. 1A-1D, comprising an emission control catalyst comprising a monolith and a supported catalyst coated on the monolith.

Figure 2:
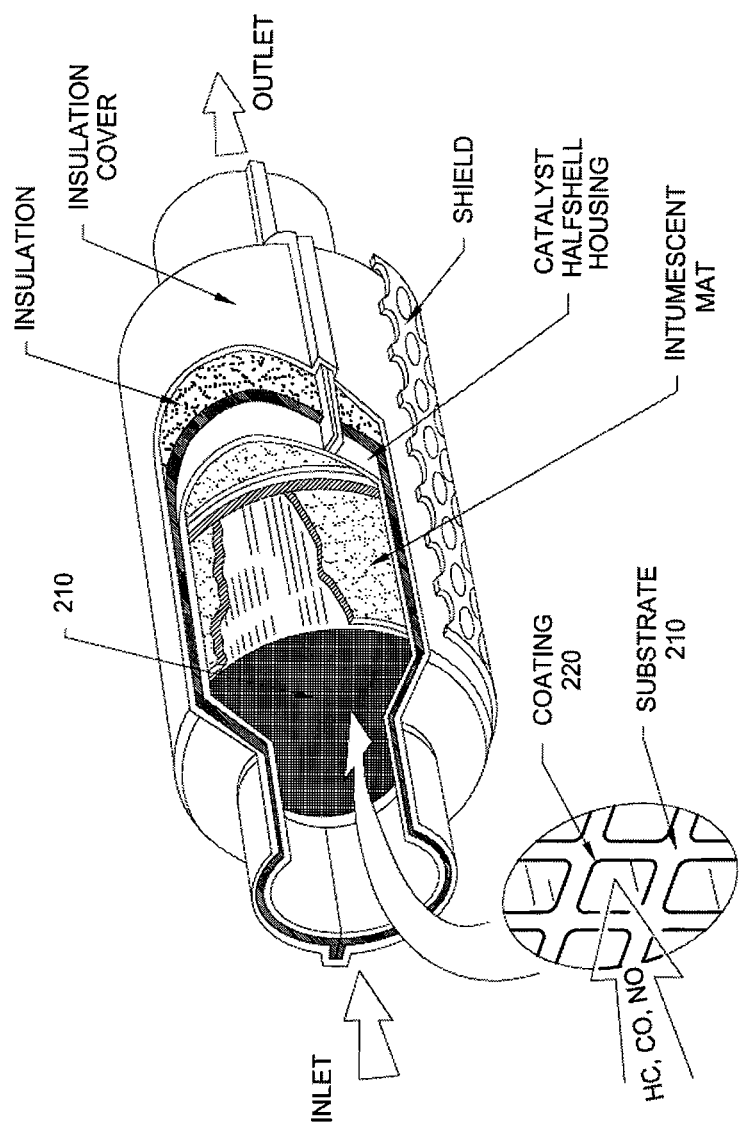
FIG. 2 is an illustration of a catalytic converter with a cut-away section that shows a substrate onto which emission control catalysts according to embodiments of the present invention are coated.

FIG. 2 is an illustration of a catalytic converter with a cut-away section that shows a substrate 210 onto which supported metal catalysts are coated. The exploded view of the substrate 210 shows that the substrate 210 has a honeycomb structure comprising a plurality of channels into which washcoats containing supported metal catalysts are flowed in slurry form so as to form coating 220 on the substrate 210.

Figure 3B:
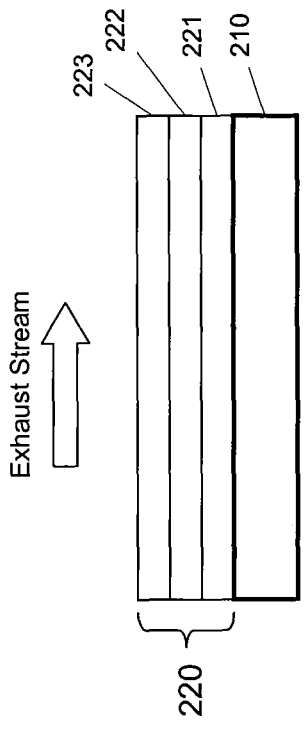
FIGS. 3A-3D illustrate different configurations of a substrate for an emission control catalyst.
Figure 3A:
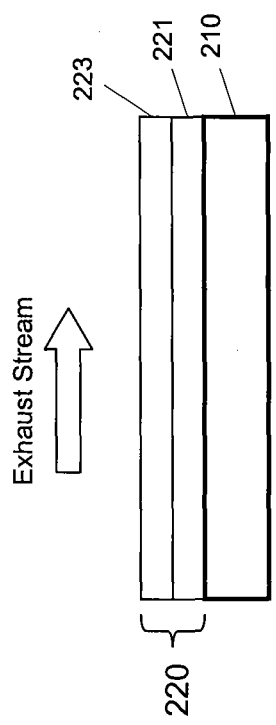

FIGS. 3A-3D illustrate different configurations of a substrate for emission control catalysts. In the configuration of FIG. 3A, coating 220 comprises two washcoat layers 221, 223 on top of substrate 210. Washcoat layer 221 is the bottom layer that is disposed directly on top of the substrate 210 and contains metal particles having palladium and gold in close contact (also referred to as "palladium-gold metal particles"). Washcoat layer 223 is the top layer that is in direct contact with the exhaust stream and contains metal particles having platinum alone or in close contact with another metal species such as palladium (also referred to as "platinum-containing metal particles"). Based on their positions relative to the exhaust stream, washcoat layer 223 encounters the exhaust stream before washcoat layer 221.

In the configuration of FIG. 3B, coating 220 comprises three washcoat layers 221, 222, 223 on top of substrate 210. Washcoat layer 221 is the bottom layer that is disposed directly on top of the substrate 210 and includes palladium-gold metal particles. Washcoat layer 223 is the top layer that is in direct contact with the exhaust stream and includes platinum-containing metal particles. Washcoat layer 222 is the middle layer that is disposed in between washcoat layers 221, 223. The middle layer is provided to minimize the interaction between the Pt and Pd—Au components. The middle layer may be a blank support or may contain zeolites, rare earth oxides, or inorganic oxides. Based on their positions relative to the exhaust stream, washcoat layer 223 encounters the exhaust stream before washcoat layers 221, 222, and washcoat layer 222 encounters the exhaust stream before washcoat layer 221.

Figure 3D:
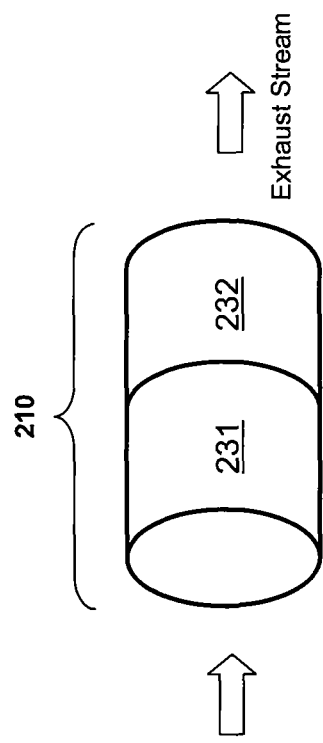
Figure 3C:
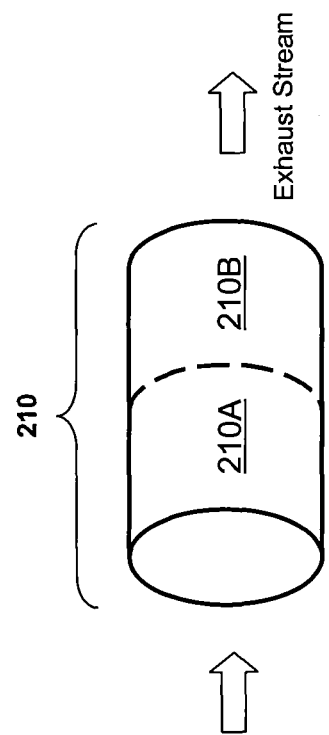

In the configuration of FIG. 3C, the substrate 210 is a single monolith that has two coating zones 210A, 210B. A washcoat including platinum-containing metal particles is coated onto a first zone 210A and a washcoat including palladium-gold metal particles is coated onto a second zone 210B.

In the configuration of FIG. 3D, the substrate 210 includes first and second monoliths 231, 232, which are physically separate monoliths. A washcoat including platinum-containing metal particles is coated onto the first monolith 231 and a washcoat including palladium-gold metal particles is coated onto the second monolith 232.

All of the configurations described above include a palladium-gold catalyst in combination with a platinum-based catalyst. The weight ratio of palladium to gold in the palladium-gold catalyst is about 0.05:1 to 20:1, preferably from about 0.5:1 to about 2:1. The palladium-gold catalyst may be promoted with bismuth or other known promoters. The platinum-based catalyst may be a platinum catalyst, a platinum-palladium catalyst, a platinum catalyst promoted with bismuth or other known promoters, or other platinum-based catalysts (e.g., Pt—Rh, Pt—Ir, Pt—Ru, Pt—Au, Pt—Ag, Pt—Rh—Ir, Pt—Ir—Au, etc.). When a platinum-palladium catalyst is used as the platinum-based catalyst, the weight ratio of platinum to palladium in this catalyst is about 0.05:1 to 20:1, preferably from about 1.5:1 to about 4:1.

In addition, the platinum-based catalyst is situated so that it encounters the exhaust stream prior to the palladium-gold catalyst. By positioning the platinum-based catalyst relative to the palladium-gold catalyst in this manner, the inventors have discovered that HC inhibition effects on the oxidation activity of the palladium-gold catalyst are reduced to sufficient levels so that the overall catalytic performance is improved. In the configurations of FIGS. 3A and 3B, the platinum-based catalyst is included in the top layer 223 and the palladium-gold catalyst is included in the bottom layer 221. In the configuration of FIG. 3C, the platinum-based catalyst is included in the first zone 210A and the palladium-gold catalyst is included in the second zone 210B. In the configuration of FIG. 3D, the platinum-based catalyst is included in the first monolith 231 and the palladium-gold catalyst is included in the second monolith 232.

A hydrocarbon absorbing material may be added to the emission control catalyst. Preferably, the hydrocarbon absorbing material is added to the emission control catalyst so that it encounters exhaust stream prior to the palladium-gold catalyst. By positioning the hydrocarbon absorbing material relative to the palladium-gold catalyst in this manner, the inventors have discovered that HC inhibition effects on the oxidation activity of the palladium-gold catalyst are reduced to sufficient levels so that the overall catalytic performance is improved. In the configuration shown in FIG. 3A, the hydrocarbon absorbing material may be included in the top layer 223. In the configuration shown in FIG. 3B, the hydrocarbon absorbing material may be included in the middle layer 222 or the top layer 223. In the configuration shown in FIG. 3C, the hydrocarbon absorbing material may be included in the first zone 210A. In the configuration shown in FIG. 3D, the hydrocarbon absorbing material may be included in the front monolith 231. In the examples provided below, a hydrocarbon absorbing material is zeolite. Zeolite may be a beta zeolite, ZSM-5 zeolite, Y zeolite, and mixtures of them, with or without other types of zeolites, in any weight ratio. In addition, any of the washcoat layers or zones, or monoliths may include rare-earth oxides, such as cerium (IV) oxide ($CeO_2$) and ceria-zirconia ($CeO_2$—$ZrO_2$).

FIG. 4 is a flow diagram that illustrates a method for preparing an emission control catalyst using the substrate 210. In step 410, a first supported catalyst, e.g., supported palladium-gold catalyst, is prepared in accordance with the methods described below. In step 412, a second supported catalyst, e.g., supported platinum-based catalyst, is prepared in accordance with known methods or any of the methods for producing supported platinum-based catalysts as described in U.S. patent application Ser. No. 11/624,116 and U.S. patent application Ser. No. 11/624,128. A monolithic substrate, such as substrate 210 shown in FIG. 2 (or monolithic substrates 231, 232 shown in FIG. 3D) is provided in step 414. Exemplary monolithic substrates include those that are ceramic (e.g., cordierite), metallic, or silicon carbide based. In step 416, the first supported catalyst in powder form are mixed in a solvent to form a washcoat slurry, and the washcoat slurry is coated as the bottom layer of the substrate 210 or onto a rear zone or rear monolith of the substrate 210. In step 418, the second supported catalyst in powder form are mixed in a solvent to form a washcoat slurry, and the washcoat slurry is coated as the top layer of the substrate 210 or onto a front zone or front monolith of the substrate 210. Optionally, zeolite or zeolite mixture including one or more of beta zeolite, ZSM-5 zeolite, Y zeolite and other types of zeolites is added to the washcoat slurry before the washcoat slurry is coated in step 418.

FIG. 5 is a flow diagram that illustrates another method for preparing an emission control catalyst using the substrate 210. In step 510, a first supported catalyst, e.g., supported palladium-gold catalyst, is prepared in accordance with the methods described below. In step 512, a second supported catalyst, e.g., supported platinum-based catalyst, is prepared in accordance with known methods or any of the methods for producing supported platinum-based catalysts as described in U.S. patent application Ser. No. 11/624,116 and U.S. patent application Ser. No. 11/624,128. A monolithic substrate, such as substrate 210 shown in FIG. 2, is provided in step 514. Exemplary monolithic substrates include those that are ceramic (e.g., cordierite), metallic, or silicon carbide based. In step 516, the first supported catalyst in powder form is mixed in a solvent to form a washcoat slurry, and the washcoat slurry is coated as the bottom layer of the substrate 210. In step 517, zeolite or zeolite mixture is added to a solvent to form a washcoat slurry and this washcoat slurry is coated as the middle layer of the substrate 210. In step 518, the second supported catalyst in powder form are mixed in a solvent to form a washcoat slurry, and the washcoat slurry is coated as the top layer of the substrate 210.

Figure 6A:
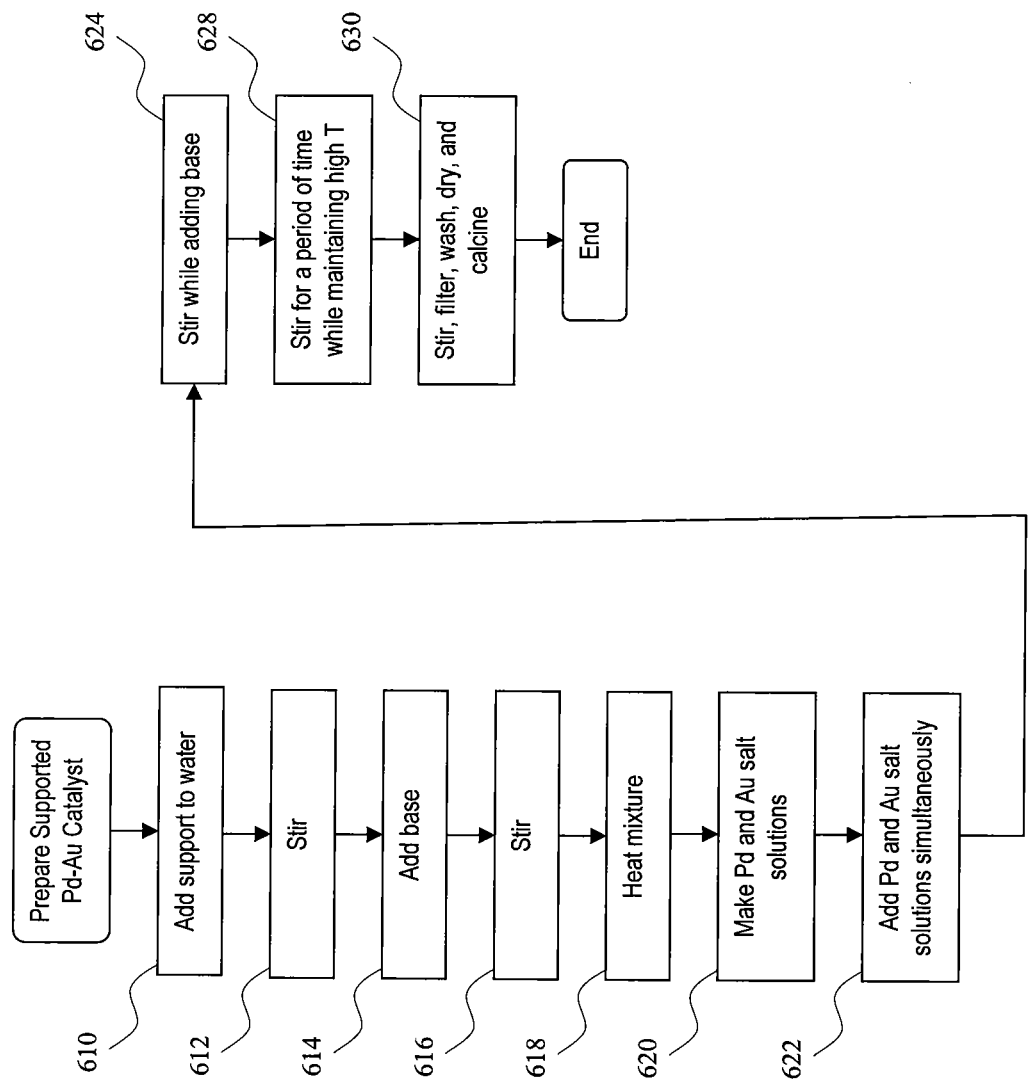
FIG. 6A is a flow diagram illustrating the steps for preparing a supported palladium-gold catalyst according to an embodiment of the present invention.

FIG. 6A is a flow diagram illustrating the steps for preparing a supported palladium-gold catalyst according to an embodiment of the present invention. In step 610, support materials for the catalyst, e.g., alumina, is added to water, preferably de-ionized water. The mixture is then stirred for 10 to 30 minutes in step 612. This is followed by the steps of adding a base, e.g., sodium hydroxide (NaOH) or sodium carbonate ($Na_2CO_3$) to the mixture (step 614) and then stirring (step 616). In step 618, the mixture is heated to a temperature that is above room temperature (generally, room temperature is about 20-25° C.), e.g., 343 K and above. In separate vessels, solutions of palladium and gold salts are made (step 620), and are added dropwise to the mixture simultaneously (step 622). The types of palladium salts that can be used include palladium (II) chloride, sodium and potassium chloropalladate (II), palladium (II) nitrate, nitrite, and oxalate, and hydrated palladium (II) oxide. The types of gold salts that can be used include gold (III) chloride, gold (III) acetate, tetrachloroauric (III) acid, and sodium tetrachloroaurate (III) hydrate. As the solutions of palladium and gold salts are added, the mixture is stirred and the pH of the mixture is maintained at a level that is greater than 7.0, preferably greater than 7.5, by adding base, e.g., the same base used in step 614 (step 624). Then, the mixture is stirred for at least 3 hours while keeping the temperature of the mixture at a high temperature of at least 343 K (step 628). This is followed by stirring, filtering, washing with de-ionized water at 323 K to 343 K, drying and calcining (step 630). The resulting product is a supported palladium-gold catalyst.

The following has been observed regarding the process parameters set forth above. Both a lower pH for the mixture and a lower temperature for the mixture lead to a decrease in catalytic performance. In addition, greater metal loss has been observed for shorter stirring times and if room temperature water, instead of warm water, is used for washing. In step 630, using warm de-ionized water at elevated temperatures (323 K to 343 K) instead of de-ionized water at room temperature helps reduce gold metal loss, from about 1%-2% to about 0.2%-0.4% according to filtrate analysis.

In the method described above, a reducing agent was not introduced to the mixture at any time but metallic palladium-gold particles were observed using XPS (X-ray Photoelectron Spectroscopy). Although palladium salts are stable at high pHs, palladium can be reduced in the presence of auric acid because gold acts as a reduction catalyst.

In addition, this method produces a supported catalyst containing metal particles consisting essentially of palladium and gold species in close contact, where over 90% of palladium detected by XPS is present in the form of $Pd^0$ and all of the gold detected by XPS is in the form of $Au^0$. Furthermore, Au core Pd shell structure is indicated by XPS. This is advantageous because it is believed that Pd provides the catalytic center for CO and HC oxidation. Au is helping Pd to be kept in the reduced form in the oxidizing environment. This structure provides maximum metal surface area for catalytic reactions.

Figure 6B:
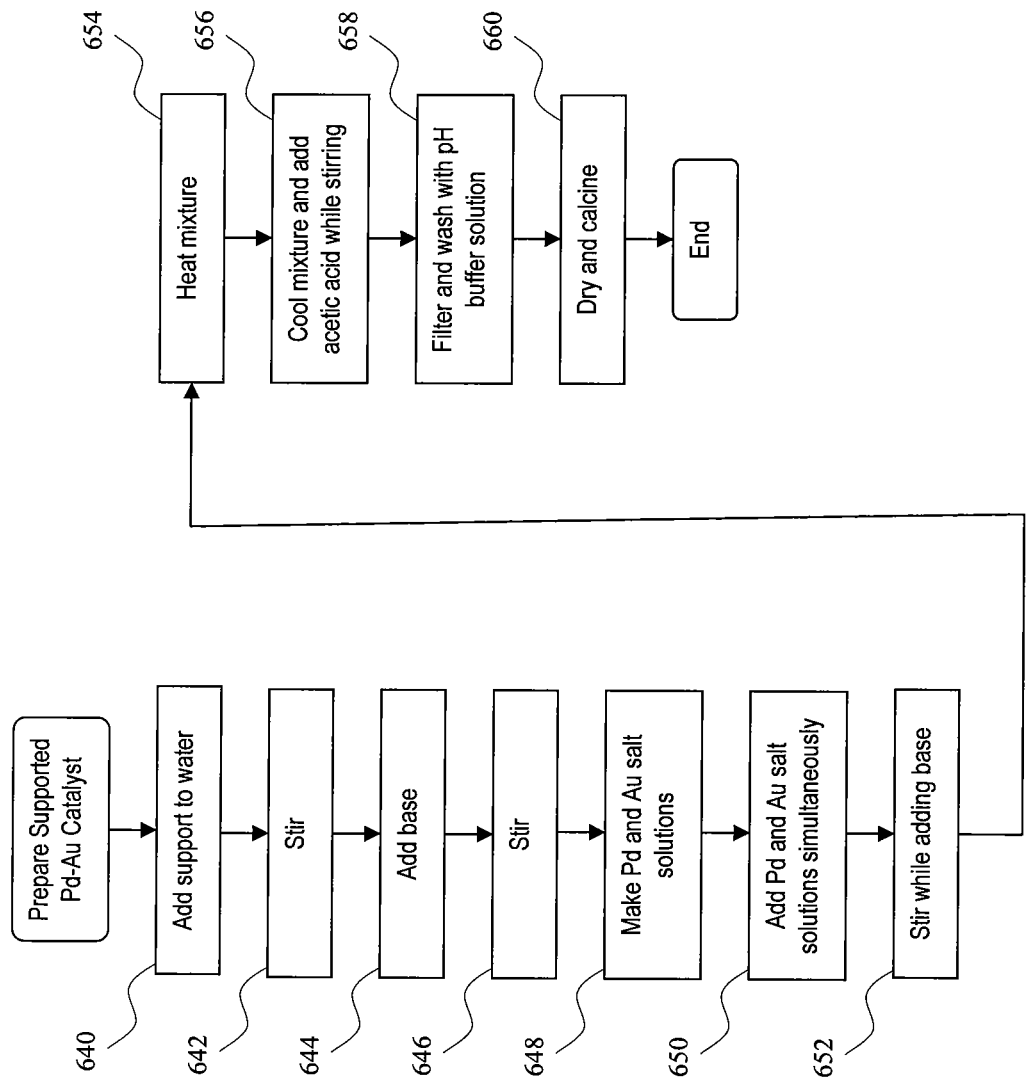
FIG. 6B is a flow diagram illustrating the steps for preparing a supported palladium-gold catalyst according to another embodiment of the present invention.

FIG. 6B is a flow diagram illustrating the steps for preparing a supported palladium-gold catalyst according to another embodiment of the present invention. In step 640, support materials for the catalyst, e.g., alumina, is added to water, preferably de-ionized water. The mixture is then stirred for 10 to 30 minutes in step 642. This is followed by the steps of adding a base, e.g., sodium hydroxide (NaOH) or sodium carbonate ($Na_2CO_3$) to the mixture (step 644) and then stirring (step 646). In separate vessels, solutions of palladium and gold salts are made (step 648), and are added dropwise to the mixture simultaneously (step 650). The types of palladium salts that can be used include palladium (II) chloride, sodium and potassium chloropalladate (II), palladium (II) nitrate, nitrite, and oxalate, and hydrated palladium (II) oxide. The types of gold salts that can be used include gold (III) chloride, gold (III) acetate, tetrachloroauric (III) acid, and sodium tetrachloroaurate (III) hydrate. As the solutions of palladium and gold salts are added, the mixture is stirred and the pH of the mixture is maintained at a level that is about 10.0, by adding base, e.g., the same base used in step 644 (step 652). In step 654, the mixture is heated from room temperature to about 368 K, and maintained at that temperature for a period of time. Then, the mixture is cooled to about 338 K, and as the mixture is cooled, acetic acid is added to the mixture while stirring to adjust the pH to be 7.7 to 8.1, preferably 7.8 to 7.9, at 338 K (step 656). The mixture is then filtered to separate out the supported catalyst and washed with a pH buffer solution, e.g., ammonium bicarbonate (step 658). This is followed by drying and calcining (step 660). The resulting product is a supported palladium-gold catalyst.

Figure 6C:
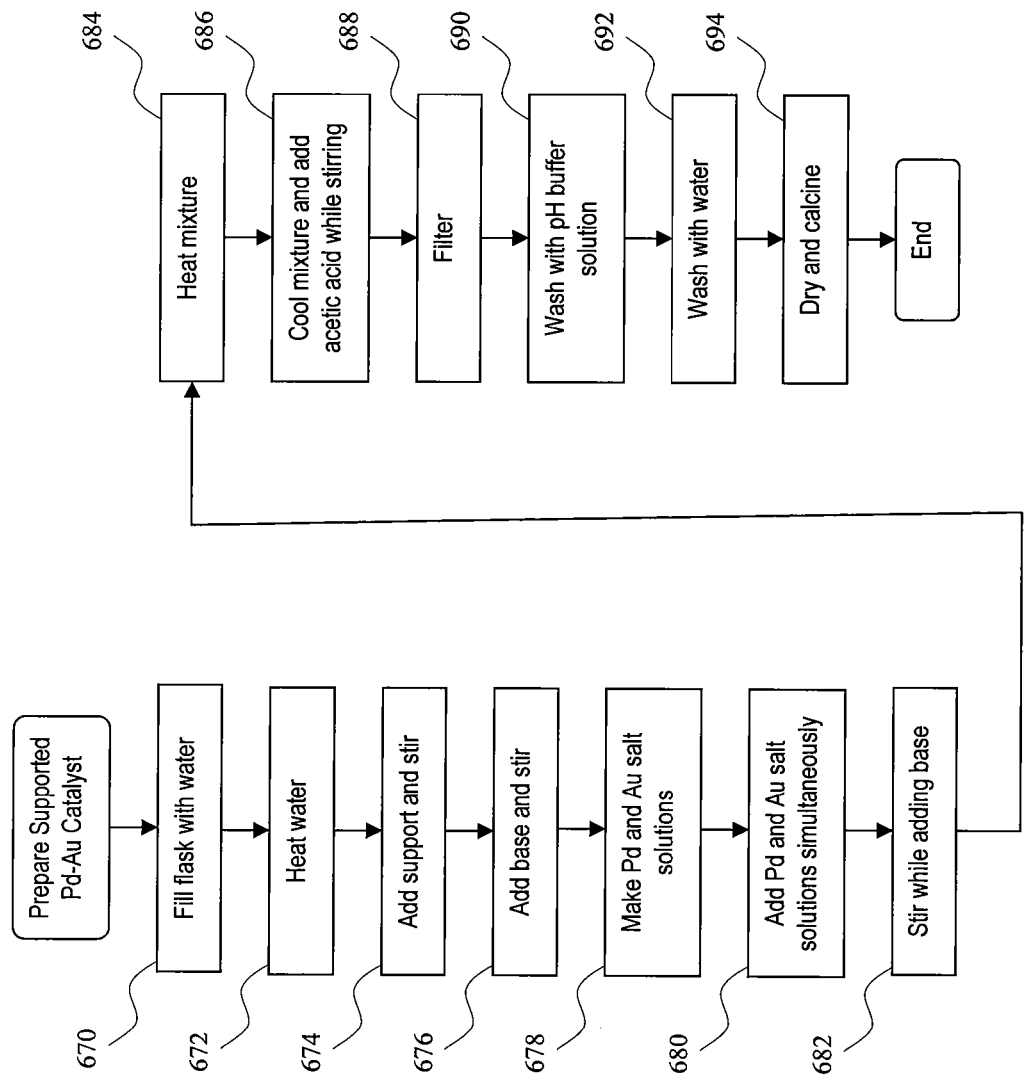
FIG. 6C is a flow diagram illustrating the steps for preparing a supported palladium-gold catalyst according to still another embodiment of the present invention.

FIG. 6C is a flow diagram illustrating the steps for preparing a supported palladium-gold catalyst according to still another embodiment of the present invention. In step 670, a flask is filled with water, preferably de-ionized water. The water in the flask is heated in step 672 to a temperature of about 368 K (step 672). Then, support materials for the catalyst, e.g., alumina, is added to the water and stirred (step 674). The mixture is stirred for about 1 hour. This is followed by the steps of adding a base, e.g., sodium hydroxide (NaOH) or sodium carbonate ($Na_2CO_3$) to the mixture and then stirring (step 676). In separate vessels, solutions of palladium and gold salts are made (step 678), and are added dropwise to the mixture simultaneously (step 680). The types of palladium salts that can be used include palladium (II) chloride, sodium and potassium chloropalladate (II), palladium (II) nitrate, nitrite, and oxalate, and hydrated palladium (II) oxide. The types of gold salts that can be used include gold (III) chloride, gold (III) acetate, tetrachloroauric (III) acid, and sodium tetrachloroaurate (III) hydrate. As the solutions of palladium and gold salts are added, the mixture is stirred and the pH of the mixture is maintained at a level that is about 8.0, by adding base, e.g., the same base used in step 676 (step 682). In step 684, the mixture is heated to about 368 K, and maintained at that temperature for a period of time. Then, the mixture is cooled to about 338 K, and as the mixture is cooled, acetic acid is added to the mixture while stirring to adjust the pH to be 7.7 to 8.1, preferably 7.8 to 7.9, at 338 K (step 686). The mixture is then filtered to separate out the supported catalyst (step 688) and washed (steps 690 and 692). The first washing step, step 690, is carried out with a pH buffer solution, e.g., ammonium bicarbonate. The second washing step, step 692, is carried out with water, preferably de-ionized water. This is followed by drying and calcining (step 694). The resulting product is a supported palladium-gold catalyst.

In the methods illustrated in FIGS. 6B and 6C and described above, the inventors have observed higher metal loss with pH increases when the mixture is cooled in steps 654 and 684. For this reason, acetic acid is introduced in steps 656 and 686 to bring pH down to a desired range. The acetic acid also helps with the fixing of Au on the support and reduces filtration and washing time by 90%. In addition, ammonium bicarbonate is used for washing because bicarbonate salts act as a pH buffer so that a pH level of the washing solution can be maintained between 7.0 and 9.0 during the washing step. As a result of using acetic acid and ammonium bicarbonate in the methods illustrated in FIGS. 6B and 6C, metal loss has been reduced significantly. In fact, no metal loss was observed in the methods illustrated in FIGS. 6B and 6C, in contrast to 5% Pd metal loss and 10% Au metal loss when acetic acid and ammonium bicarbonate were not used. The acetic acid and ammonium bicarbonate also helps to create a wide mesoporous alumina which is effective in providing reactants like CO and HC easier access to the catalysts. The following table shows the effect on the pore sizes at the surface of the alumina support material when acetic acid and ammonium bicarbonate are used.

|  | pore diameter < 10 nm | 10 nm < pore diameter < 20 nm | pore diameter > 20 nm |
| --- | --- | --- | --- |
| without acetic acid and bicarbonate treatment | 46% of surface area | 44% of surface area |  |
| with acetic acid and bicarbonate treatment | 30% of surface area | 20% of surface area | 50% of surface area |

The following two supported palladium-gold catalyst samples were prepared using the method shown in FIG. 6A.

EXAMPLE 1

1.67% Pd, 2.0% Au Supported Catalyst

Add 3.853 g of alumina powder to 15 mL of de-ionized water and stir for 10 minutes. Add in 3.2 mL of 1 M NaOH to mixture and increase the temperature to 368 K. After the mixture reaches 368 K, dropwise add solutions containing 0.667 mL of 100 mg/mL $Pd(NO_3)_3$ in 2.5 mL of de-ionized water and 0.80 mL of 100 mg/mL $HAuCl_4$ in 2.5 mL of de-ionized water, to the mixture simultaneously. During this step, the pH of the mixture is maintained to be greater than 7.5 by adding additional 1 mL of 1 M NaOH to the mixture. Then, stir the mixture for 3 hours while keeping the mixture at 368 K. The mixture is then filtered and washed with de-ionized water at 323 K to separate out the supported catalyst. The supported catalyst is dried at 393 K for 3 hours, and ground to a fine powder using a mortar and pestle. The powder is calcined in air at 773 K for 2 hours using a heating ramp rate of 8 K/min.

EXAMPLE 2

2.98% Pd, 3.57% Au Supported Catalyst

Add 3.853 g of alumina powder to 15 mL of de-ionized water and stir for 10 minutes. Add in 4.2 mL of 1 M NaOH to mixture and increase the temperature to 368 K. After the mixture reaches 368 K, dropwise add solutions containing 1.19 mL of 100 mg/mL $Pd(NO_3)_3$ in 2.5 mL of de-ionized water and 1.425 mL of 100 mg/mL $HAuCl_4$ in 2.5 mL of de-ionized water, to the mixture simultaneously. During this step, the pH of the mixture is maintained to be greater than 7.5 by adding additional 3.1 mL of 1 M NaOH to the mixture. Then, stir the mixture for 3 hours while keeping the mixture at 368 K. The mixture is then filtered and washed with de-ionized water at 323 K to separate out the supported catalyst. The supported catalyst is dried at 393 K for 3 hours, and ground to a fine powder using a mortar and pestle. The powder is calcined in air at 773 K for 2 hours using a heating ramp rate of 8 K/min.

After synthesis, Examples 1 and 2 were tested for CO and $C_3H_6$ conversion performance. The CO and $C_3H_6$ conversion performance was determined under simulated exhaust conditions, which were as follows. A gas mixture having the composition: 1000 ppm CO, 225 ppm $C_3H_6$, 105 ppm $C_3H_6$, 450 ppm NO, 10% $O_2$, and He (balance) is supplied into a fixed bed flow reactor containing 10 mg (80-100 mesh size) of catalyst powder mixed with 90 mg of $\alpha$-$Al_2O_3$ (80-100 mesh size) at a total flow rate of 300 cc/min. The reactor is heated from room temperature to 673 K at 10 K/minute. As the reactor is heated, CO conversion (oxidation) was measured by use of mass spectrometry and gas chromatography as a function of temperature. $C_3H_6$ conversion (oxidation) was also measured as a function of temperature by use of mass spectrometry and gas chromatography.

Figure 7A:
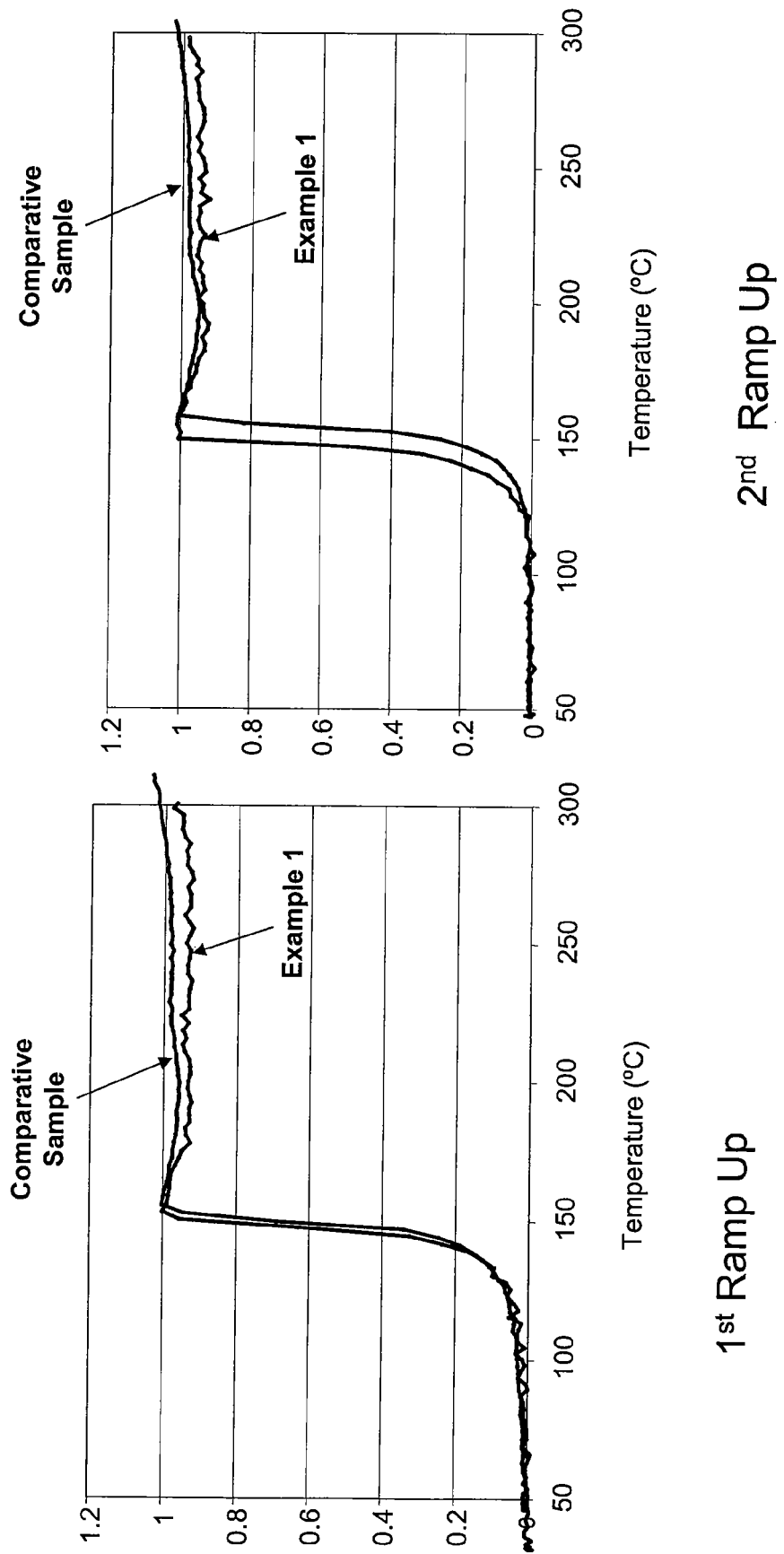
FIGS. 7A and 7B are graphs that show the catalytic efficiency of a supported palladium-gold catalyst prepared in accordance with an embodiment of the present invention.
Figure 7B:
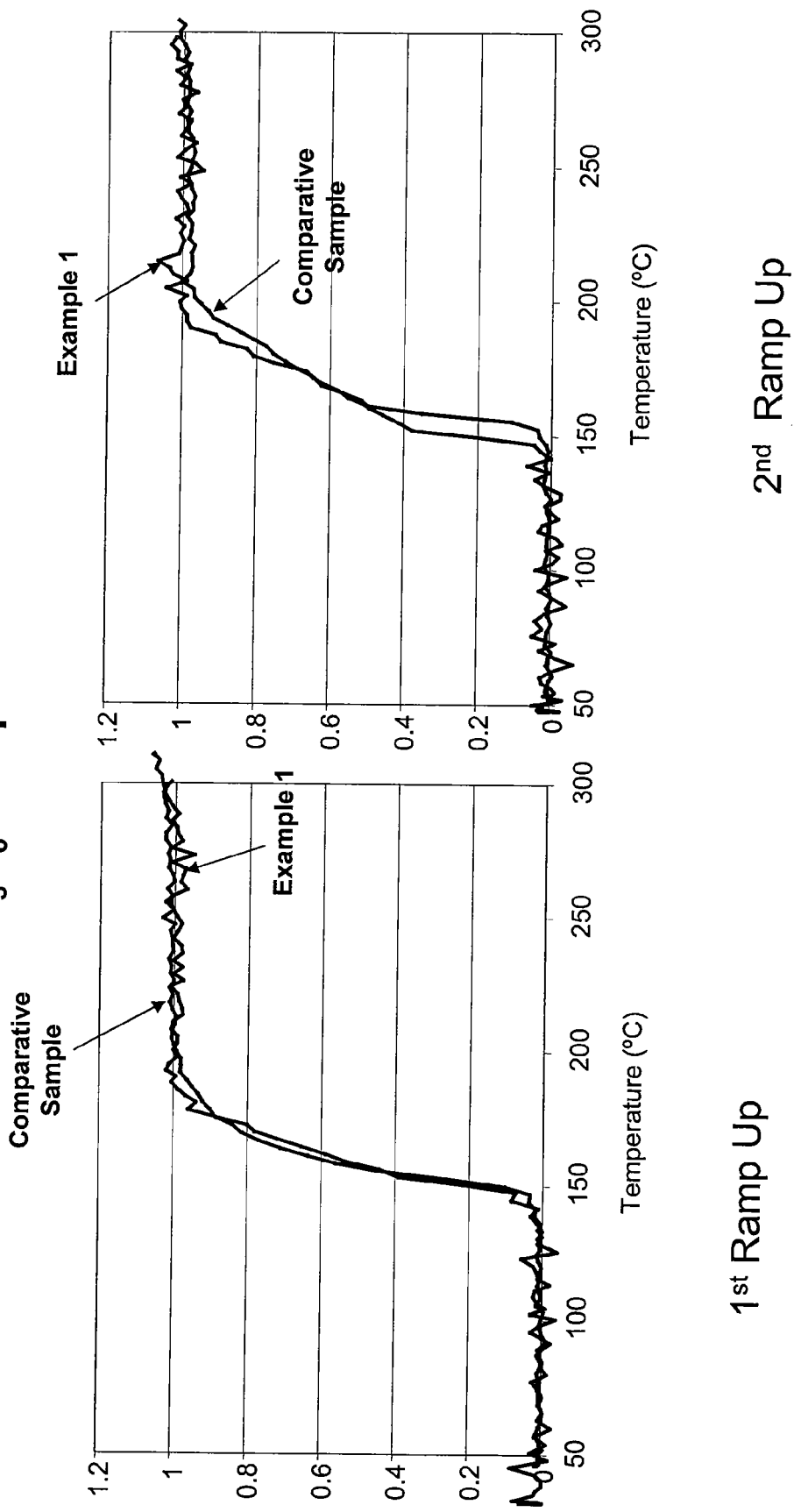
Figure 8A:
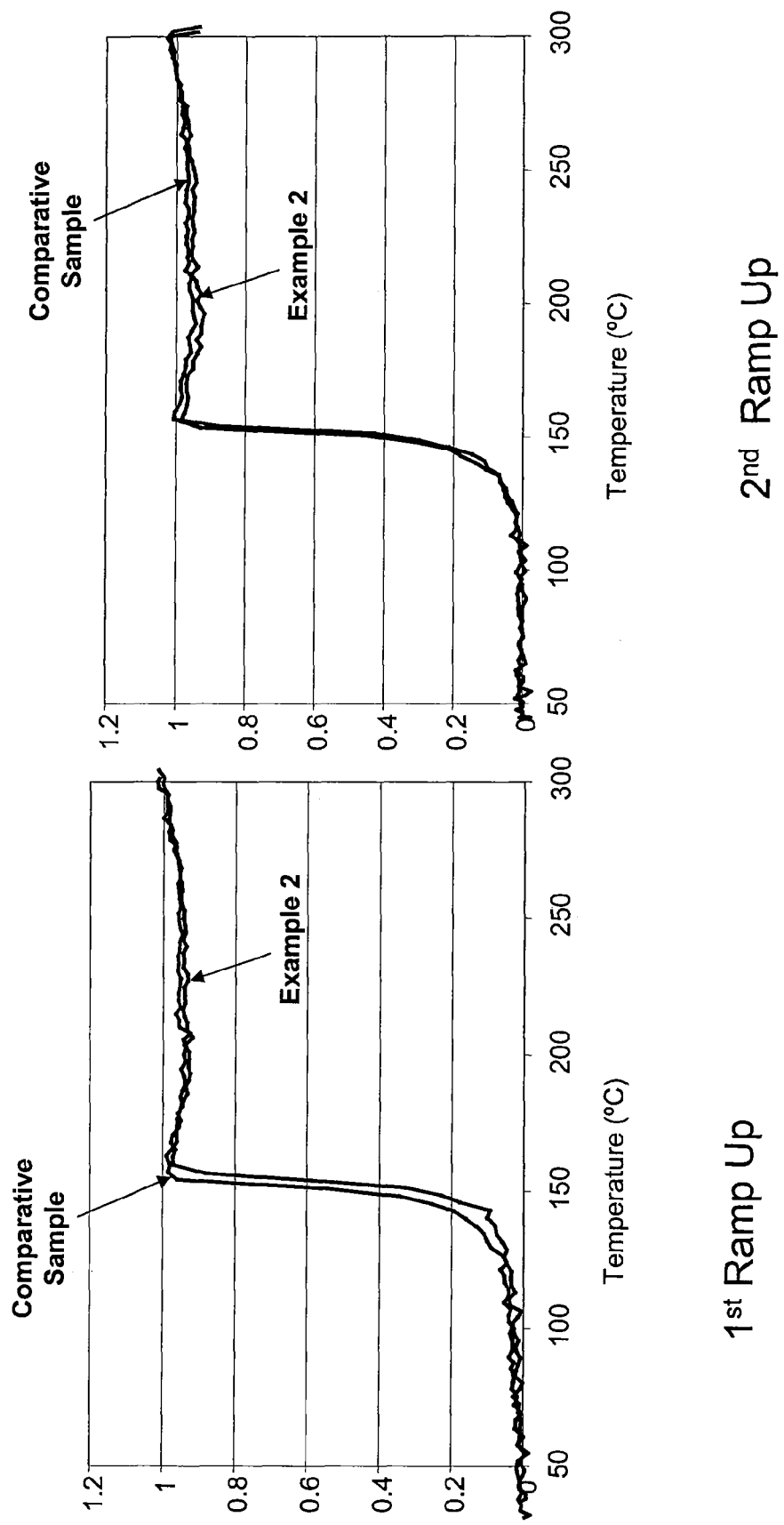
FIGS. 8A and 8B are graphs that show the catalytic efficiency of a supported palladium-gold catalyst prepared in accordance with another embodiment of the present invention.
Figure 8B:
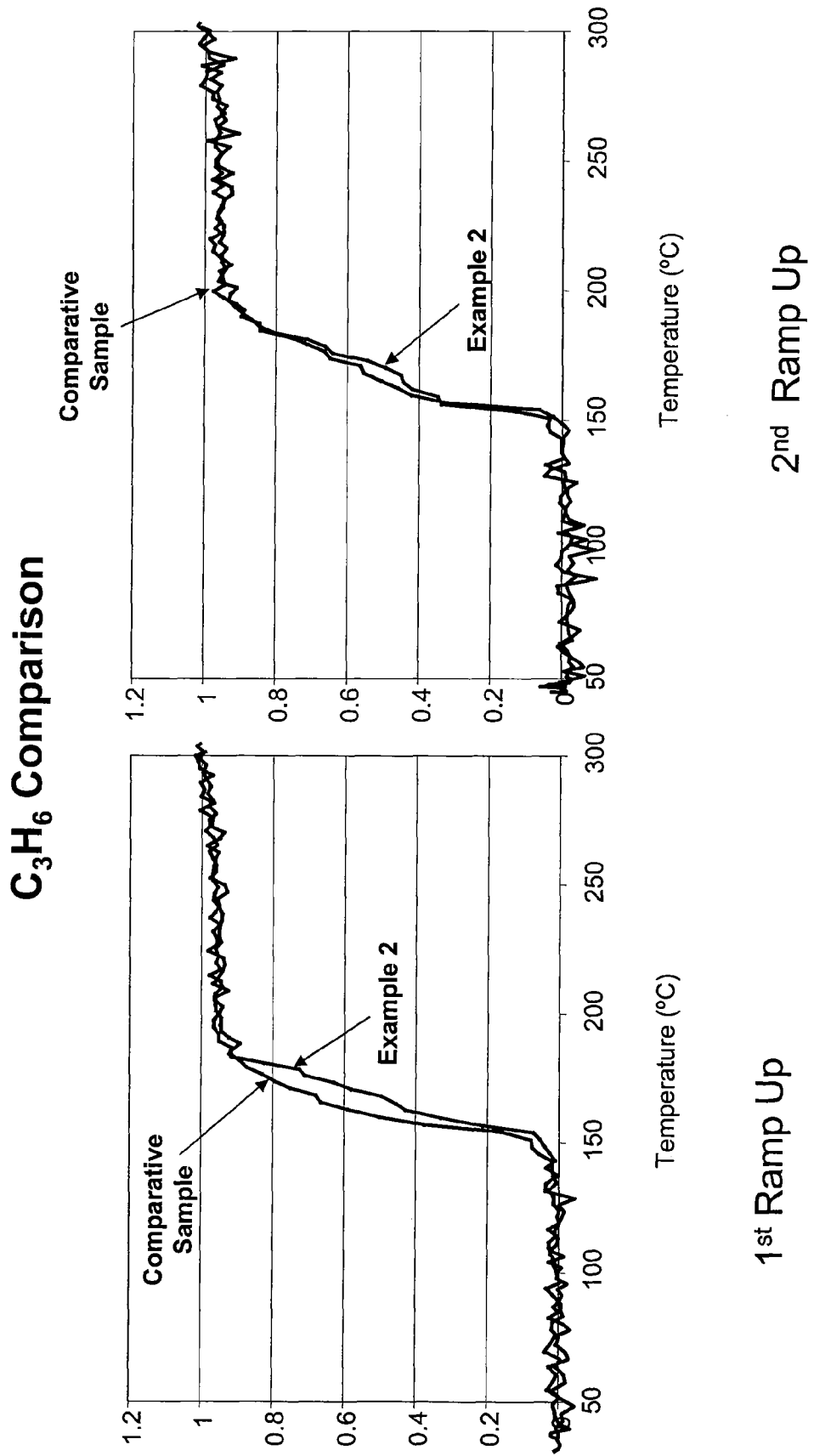

The CO and $C_3H_6$ conversion performance for Examples 1 and 2 are plotted and shown in FIGS. 7A-7B and 8A-8B. CO conversion for Example 1 is shown in FIG. 7A. $C_3H_6$ conversion for Example 1 is shown in FIG. 7B. CO conversion for Example 2 is shown in FIG. 8A. $C_3H_6$ conversion for Example 2 is shown in FIG. 8B. In each of the figures, two test runs are shown. They are represented as "1st Ramp Up" and "2nd Ramp Up." These plots show that Examples 1 and 2 perform as well as the supported palladium-gold catalysts that were synthesized using reducing agents as described in U.S. patent application Ser. No. 11/624,116 and U.S. patent application Ser. No. 11/624,128.

The following supported palladium-gold catalyst sample was prepared using the method shown in FIG. 6B.

EXAMPLE 3

1.67% Pd, 2.0% Au Supported Catalyst

Add 195.3 g alumina powder to 1 L of de-ionized water and stir for 15 minutes. Add in 82 g of 8% NaOH solution to mixture and stir for 30 minutes. Prepare 19.24 g of 17.36% Pd palladium-nitrate solution and 10.06 g of 39.77% Au tetrachloroauric acid, separately, and dilute them approximately 5%. Then, add the two salt solutions simultaneously and at the same rate to the mixture, and stir at 500 rpm. During addition of the salt solutions, pH is adjusted continuously to be approximately 10.0 with 8% NaOH solution. The additional 8% NaOH solution used is 31.3 g. The mixture is then heated to 368 K for a time period of about 2 hours. The mixture is kept at 368 K for 3 hours and then cooled to 338 K. Then, while the mixture is stirred, acetic acid is added to the mixture to adjust the pH to around 7.9 at 338 K. The mixture is then filtered to separate out the supported catalyst and washed with 4 L of 2 g ammonium bicarbonate/L. The supported catalyst is dried at room temperature for 0.5 hours before applying vacuum at 100 mbar for approximately 15 hours at 383 K, and then ground to a fine powder. The powder is calcined in air at 773 K for 2 hours using a heating ramp rate of 8 K/min and then cooled to room temperature.

The following supported palladium-gold catalyst sample was prepared using the method shown in FIG. 6C.

EXAMPLE 4

1.67% Pd, 2.0% Au Supported Catalyst

Prepare 1 L of de-ionized water and stir for 15 minutes. Turn on the heating jacket of the flask to obtain temperature of 368 K. Add 195.3 g alumina powder to the flask and stir for 1 hour. Add in 82 g of 8% NaOH solution to mixture and stir for 15 minutes. Prepare 19.24 g of 17.36% Pd palladium-nitrate solution and 10.06 g of 39.77% Au tetrachloroauric acid, separately, and dilute them approximately 5%. Then, add the two salt solutions simultaneously and at the same rate to the mixture, and stir at 500 rpm. During addition of the salt solutions, pH is adjusted continuously to be approximately 8.0 with 8% NaOH solution. The additional 8% NaOH solution used is 31.3 g. The mixture is then heated to 368 K for a time period of about 3 hours, and then cooled to 338 K. Then, while the mixture is stirred, acetic acid is added to the mixture to adjust the pH to around 7.9 at 338 K. The mixture is then filtered to separate out the supported catalyst and washed twice, first with 3 L of 0.25 g ammonium bicarbonate/L and then with 0.5 L de-ionized water. The supported catalyst is dried at room temperature for 0.5 hours before applying vacuum at 100 mbar for approximately 15 hours at 383 K, and then ground to a fine powder. The powder is calcined in air at 773 K for 2 hours using a heating ramp rate of 8 K/min and then cooled to room temperature.

In the Examples 3 and 4 given above, palladium and gold salts can be added before heating as long as base (NaOH) is added before the Pd and Au salts. If so, pH is better adjusted between 8.5 and 11.0, with 10.0 and 10.5 preferred. Further, when the acetic acid is added, pH can be adjusted at 338 K from 7.7 to 8.1, with 7.8 to 7.9 preferred. During the washing step, ammonium bicarbonate is preferred but can be replaced by sodium bicarbonate, or potassium bicarbonate or carbonates. When alkaline bicarbonate is used, it is preferred to wash with de-ionized water equaling 10-20% of the total wash amount at the end to get rid of the alkaline metals, such as sodium or potassium. The amount of wash can be 10-30 times of the catalyst weight. For instance if 100 g catalyst is prepared, the volume of wash can be between 1 L and 3 L. The ratio of 15-20 is preferred.

While particular embodiments according to the invention have been illustrated and described above, those skilled in the art understand that the invention can take a variety of forms and embodiments within the scope of the appended claims.

What is claimed is:

1. A method for producing a supported catalyst containing palladium-gold metal particles, comprising the steps of:
    preparing a mixture of support materials and a solution that is basic and having a pH that is greater than 9.0;
    adding a palladium salt solution and a gold salt solution, which have been separately prepared, to the mixture while maintaining the pH of the mixture to be greater than 7.0;
    heating the mixture and maintaining the mixture at 343 K to 369 K above room temperature for a period of time; and
    cooling the mixture and, while cooling, maintaining the pH of the mixture to be between 7.7 and 8.1.

2. The method according to claim 1, wherein the pH of the mixture, while cooling, is maintained by adding acetic acid.

3. The method according to claim 1, wherein the pH of the mixture is maintained between 8.5 and 11.0 while the palladium salt solution and the gold salt solution are added.

4. The method according to claim 1, wherein the pH of the mixture is maintained between 10.0 and 10.5 while the palladium salt solution and the gold salt solution are added.

5. The method according to claim 1, wherein the palladium and gold salt solutions are added dropwise to the mixture simultaneously.

6. The method according to claim 1, further comprising:
    filtering the mixture to separate out the supported catalyst; and
    washing the supported catalyst with a pH buffer solution.

7. The method according to claim 6, wherein the pH buffer solution comprises ammonium bicarbonate.

8. The method according to claim 6, wherein the pH buffer solution comprises alkaline bicarbonate.

9. A method for producing a supported catalyst containing palladium-gold metal particles, comprising the steps of:
    preparing a mixture of support materials and a solution that is basic and having a pH that is greater than 7.0;
    adding a palladium salt solution and a gold salt solution, which have been separately prepared, to the mixture while maintaining the pH of the mixture to be greater than 7.0;
    filtering the mixture to separate out the supported catalyst; and
    washing the supported catalyst with a pH buffer solution including bicarbonates.

10. The method according to claim 9, wherein the pH buffer solution comprises ammonium bicarbonate.

11. The method according to claim 9, wherein the pH buffer solution comprises alkaline bicarbonate.

12. The method according to claim 11, further comprising an additional washing step using water.

13. The method according to claim 9, further comprising:
    prior to the filtering step, heating the mixture and maintaining the mixture at 343 K to 369 K above room temperature for a period of time; and
    cooling the mixture and, while cooling, maintaining the pH of the mixture to be between 7.7 and 8.1.

14. The method according to claim 13, wherein the pH of the mixture is maintained by adding acetic acid.

15. The method according to claim 9, further comprising, prior to the filtering step, maintaining the mixture at above room temperature for a period of time.

16. The method according to claim 15, further comprising cooling the mixture and, while cooling, maintaining the pH of the mixture to be between 7.7 and 8.1.

17. The method according to claim 16, wherein the pH of the mixture, while cooling, is maintained by adding acetic acid.

18. The method according to claim 17, wherein the pH buffer solution comprises ammonium bicarbonate.

19. The method according to claim 17, wherein the pH buffer solution comprises alkaline bicarbonate.

* * * * *